United States Patent [19]

Hancock

[11] Patent Number: 5,239,889
[45] Date of Patent: Aug. 31, 1993

[54] LOCKING MECHANISM FOR A VEHICLE STEERING COLUMN

[75] Inventor: Michael T. Hancock, Coventry, England

[73] Assignee: The Torrington Company, Torrington, Conn.

[21] Appl. No.: 965,455

[22] Filed: Oct. 23, 1992

[30] Foreign Application Priority Data

Oct. 30, 1991 [GB] United Kingdom ............... 9122962
Jul. 30, 1992 [GB] United Kingdom ............... 9216226

[51] Int. Cl.$^5$ ............................................. B62D 1/18
[52] U.S. Cl. ..................................... 74/493; 280/777
[58] Field of Search ............... 74/493, 495; 280/777, 280/779

[56] References Cited

U.S. PATENT DOCUMENTS

| 4,194,411 | 3/1980 | Manabe et al. .............. 74/492 |
| 4,838,576 | 6/1989 | Hamasaki et al. ............ 280/777 |

FOREIGN PATENT DOCUMENTS

| 0463501A1 | 1/1992 | European Pat. Off. . |
| 63-258268 | 10/1988 | Japan ................ 74/493 |
| 2224032A | 11/1991 | United Kingdom . |

Primary Examiner—Allan D. Herrmann
Assistant Examiner—William O. Trousdell
Attorney, Agent, or Firm—Michael H. Minns

[57] ABSTRACT

A locking mechanism for locking an axially adjustable vehicle steering column. The locking mechanism comprising a steering column structure slidably attached to a break away mounting, the steering column structure being axially moveable relative to the mounting and a wedging blade for locking the steering column structure to the mounting by a wedging action in response to an actuating cable.

15 Claims, 4 Drawing Sheets

LOCKING MECHANISM FOR A VEHICLE STEERING COLUMN

BACKGROUND OF THE INVENTION

This invention relates to a locking mechanism for a vehicle steering column.

In a crash situation, it is desirable that the vehicle's steering wheel can be moved axially forward away from the driver in order to prevent the driver impacting on the steering wheel. This has been achieved by a cable activated by the rearward movement of the engine following the crash pulling a break-away steering column mounting forward. The mounting then causes the column with steering wheel to move forward. However, this clearly relies on the column with associated structure and steering wheel being relatively fixed and non-adjustable. In the case of an adjustable reach steering column with its structure, there still remains a problem as to how to cause the steering wheel to be moved out of the possible impact zone of the driver.

The foregoing illustrates limitations known to exist in present adjustable reach steering columns. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention this is accomplished by providing a locking mechanism for locking an axially adjustable vehicle steering column, the locking mechanism comprising a steering column structure slidably attached to a break away mounting, the steering column structure being axially moveable relative to the mounting; and a wedging means for locking the steering column structure to the mounting by means of a wedging action in response to an actuating means.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

According to the present invention, there is provided a locking mechanism for locking an axially adjustable vehicle steering column (or adjustable reach steering column) in a crash situation comprising a steering column structure mounted for axial movement to a break away mounting and a wedging mechanism arranged to lock the column structure to the mounting upon a crash.

Whatever the adjusted axial position of the column structure relative the mounting, a mechanism is provided to lock the column to the mounting upon a crash. A known arrangement then causes the mounting to be broken away from the structure of the vehicle.

The locking mechanism is preferably actuated by means of a cable which is arranged to pull substantially in the axial direction of the steering column towards the front of the vehicle.

Preferably, the wedging mechanism comprises a tilting means which may be a pivot block mounted pivotally to the mounting. The pivot block can be made of aluminum or aluminum alloy and can be arranged so that in its normally-pivoted position (prior to any crash situation) it has a part of it resting against or just clear of, for example, the underside of the aforementioned steering column structure. The pivot block can either be resiliently loaded into that condition or be normally held clear of the column structure.

The main body of the pivot block can be spaced from the steering column structure by a short distance by means of, for example, a plastics spacer set into an aperture in the pivot block, the tip of the plastic spacer resting against the steering column structure.

Adjacent to the spacer is provided a blade, which can be of hardened steel or a sintered component, for example, and it is this blade which, in a crash situation, is provided to dig into the steering column mounting as the pulling means (or actuating means) causes the pivot block to pivot so that the blade goes into wedging engagement. In the case of an axially adjustable steering column, this wedging engagement prevents axial movement of the steering column within its adjustment range and the effort of the pulling means is directed such that, through the wedged pivot block, the steering column is pulled away from its breakaway mounting point.

Figure 1:
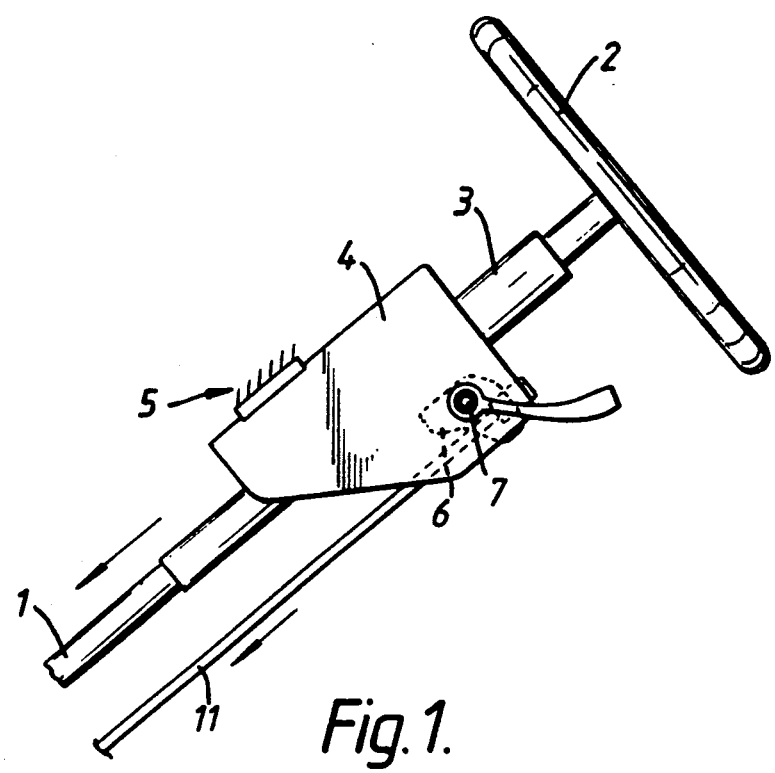
FIG. 1 is a diagrammatic view of an adjustable reach steering column incorporating a mechanism to cause it to be demounted in the event of a crash situation.

Referring to the drawings, FIG. 1 shows an adjustable reach steering column 1 with steering wheel 2 and a structure 3 which allows it to be axially slidably adjusted. The structure 3 is mounted for axial movement in a bracket 4 which forms a steering column mounting with a breakaway mounting area 5 where the bracket 4 is mounted to another part of the vehicle structure or body.

The steering column structure 3 includes an outer tube 15 and a generally U-shaped bracket 9 which extends downwards. Pivotally mounted to the bracket 9 about a pivot pin 7 is a pivot block 6 having a plastics spacer 8. The pivot block 6 being normally located preferably by a resilient means, such as spacer 8, in a non-crash condition against or slightly clear of the underside of bracket 9.

The spacer 8 is formed of, for instance, nylon with a stem 8′ of smaller diameter than the head 8″, the purpose for which will be described below.

Figure 4:
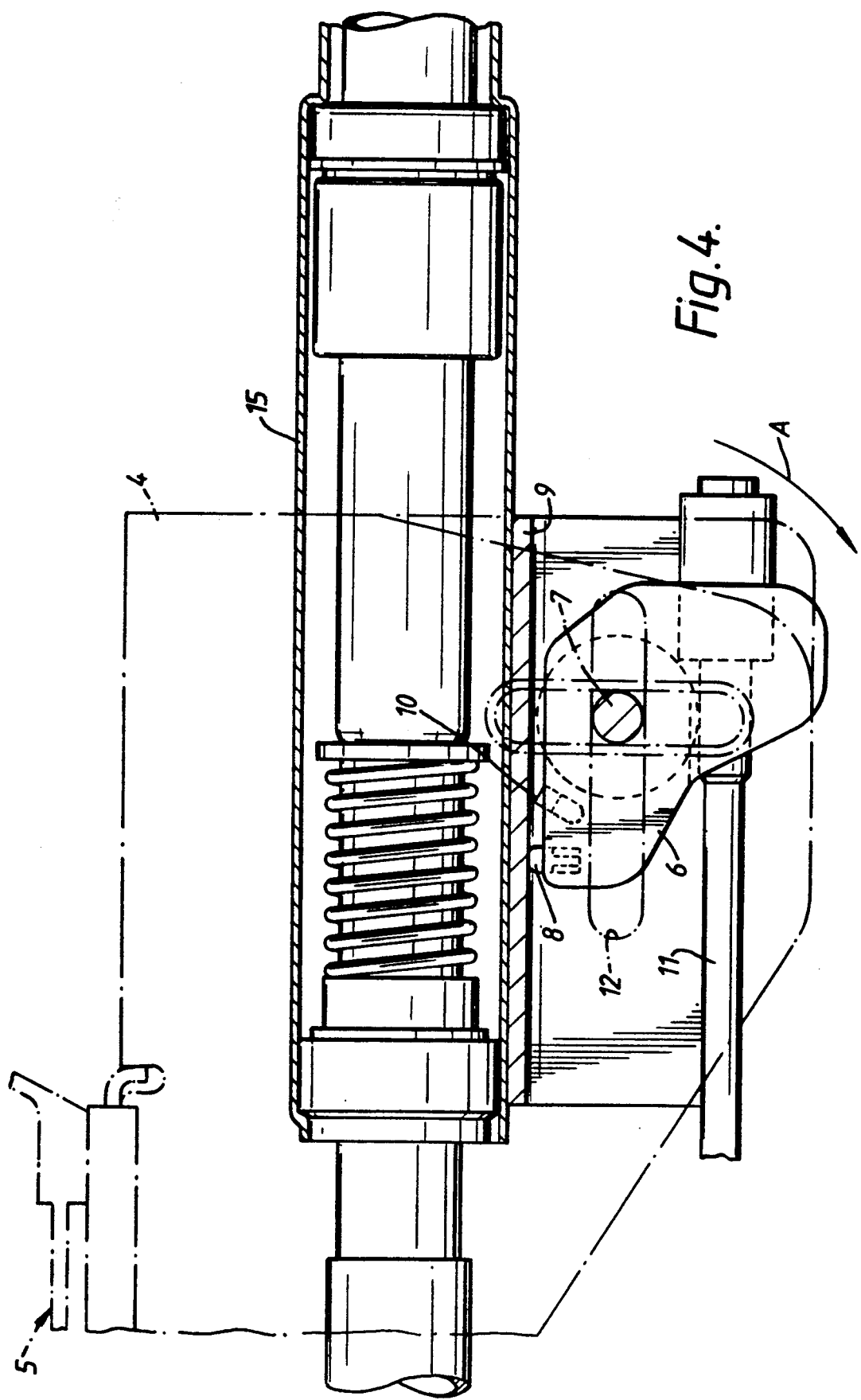
FIG. 4 is a partial cross-sectional view of the present invention.

Located close to the plastics spacer 8 is an insert block in the pivot block 6 and constituting a wedging means in the form of a blade 10 which, as can be seen from FIG. 4, has a tip which is normally held clear of contact with the bracket by the plastic spacer.

Taking a line which passes through the pivot axis of the pivot pin 7 and the blade 10, one arrives at a location on the opposite side of the pivot block 6, i.e. remote from the blade 10. It is in the region of this opposite side that the pulling means (or actuating means) is attached to the pivot block 6 to cause it to rotate in the event of a crash of the vehicle.

The pulling means is in the form of a cable 11 which generally extends parallel to the axis of the steering column.

In the embodiment illustrated, the pivot block 6 and associated parts are incorporated in the axially adjustable steering column mechanism and it will be seen that the pivot axis 7 is normally laterally moveable along a slot 12 so as to adjust the steering wheel position.

Figure 2:
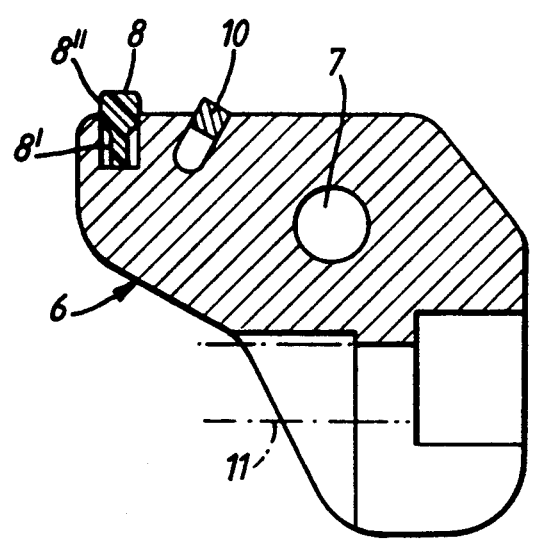
FIG. 2 is a sectional view of the pivot mechanism.
Figure 3:
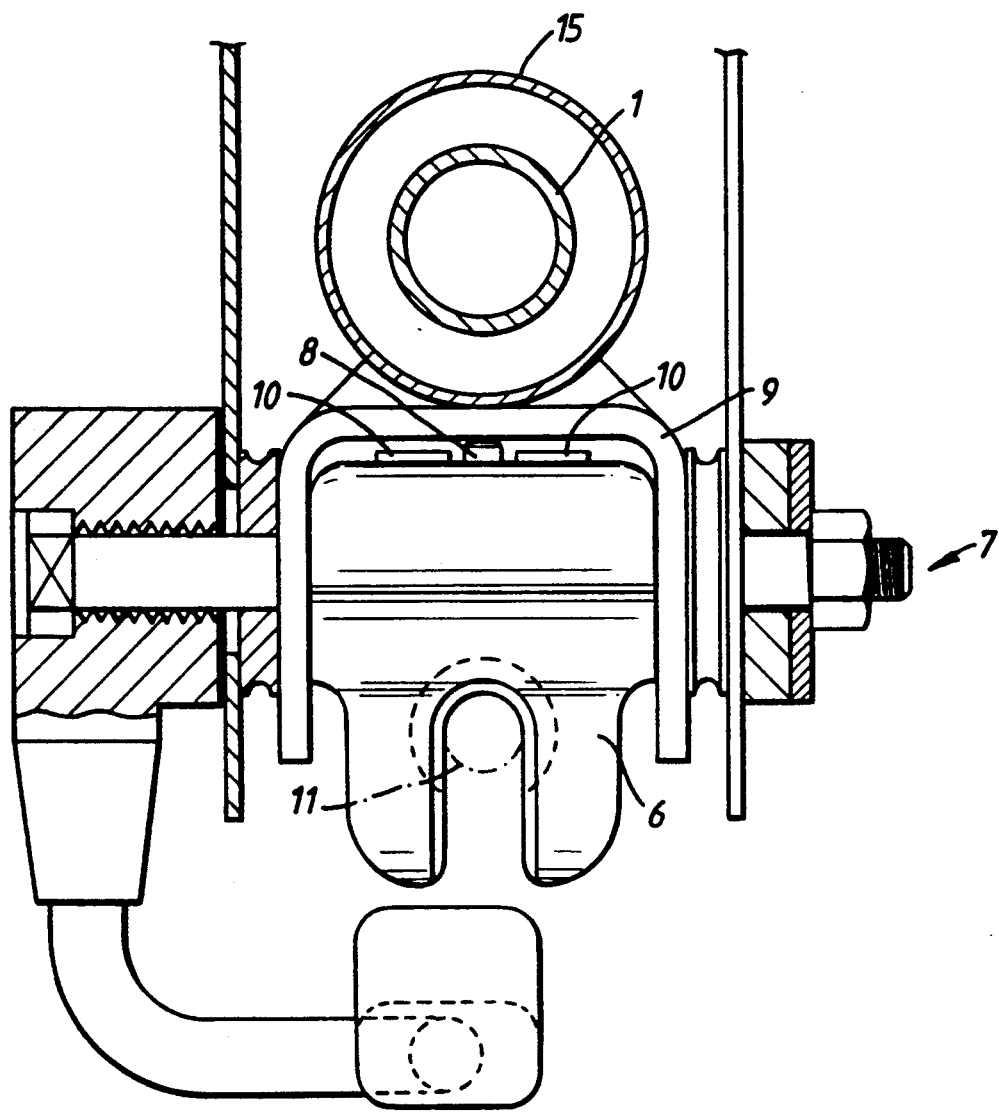
FIG. 3 is a partial cross-sectional view of the pivot mechanism mounted in its normal position.

In the event of a crash situation, the cable 11 is provided to be pulled in a direction which is to the left as viewed in FIGS. 1, 2, and 4, and this causes the pivot block 6 to rotate sharply about its pivot 7 in the direction of the arrow A in FIG. 4, which has the result of compressing the plastics locator 8 and crushing its stem 8'. The blade 10 is thereby caused to dig into the underside of the bracket 9 so that the pivot block assembly is wedged and therefor prevented from sliding along the slot 12 for normal column adjustment. Continued pull of the cable 11 then pulls the complete steering column 1 from the breakaway mounting 5 and away from the driver.

It will be appreciated that more than one plastics locator 8 or the like can be provided and, similarly, the wedging blade 10 is only one particularly preferred form of wedging means to cause the pivot means to wedge against a part of the steering column structure upon crash. In the form illustrated, it will be noted that two wedging projections of blade 10 are provided.

Figure 5:
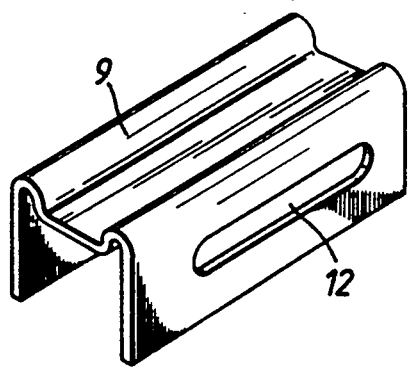
FIG. 5 is a perspective view of the linear adjustment bracket shown in FIGS. 3 and 4.
Figure 6:
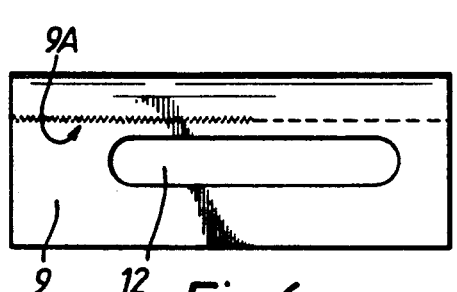
FIG. 6 is a side view of the bracket shown in FIG. 5.
Figure 7:
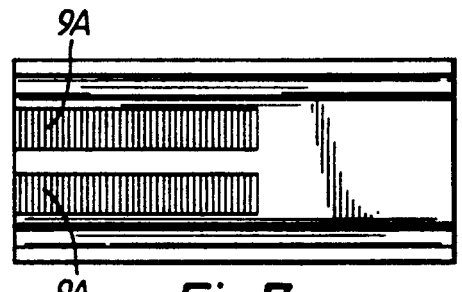
FIG. 7 is a bottom view of the bracket shown in FIG. 5.

FIGS. 5 to 7 show in greater detail a preferred form of bracket 9 and it will be seen that the underside of it can have a plain surface, as shown in the right-hand side of FIGS. 6 and 7, or can be provided with serrations 9A as shown in the left-hand side of those FIGS. In either case, the wedging zone of the pivot block 6 will lock against the underside of the bracket 9, against the plain surfaces or the serrated surfaces respectively.

Figure 8:
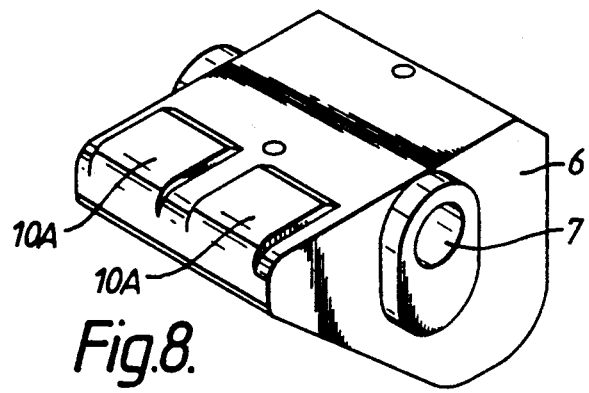
FIG. 8 is a perspective view of a second embodiment of the pivot block illustrated in FIGS. 2 to 4.

FIG. 8 shows another form of pivot block 8 in which the wedging blade 10 is substituted by a pair of plain surface wedging platforms 10A for wedging against the underside of the bracket 9.

Figure 9:
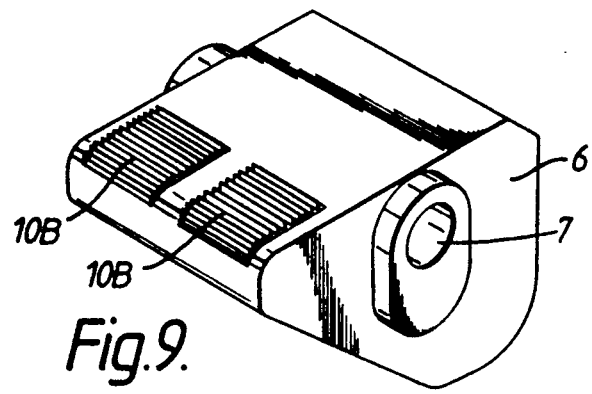
FIG. 9 is a view similar to FIG. 8 showing a further embodiment of the pivot block.

FIG. 9 shows a modification to the wedging platforms, in that the wedging platforms 10B are serrated.

Having described the invention, what is claimed is:

1. A locking mechanism for locking an axially adjustable vehicle steering column comprising:
 a steering column structure slidably attached to a break away mounting, the steering column structure being axially moveable relative to the mounting; and
 a wedging means for locking the steering column structure to the mounting by means of a wedging action in response to an actuating means.

2. The locking mechanism according to claim 1, wherein the actuating means is a cable arranged to pull substantially in the axial direction of the steering column.

3. The locking mechanism according to claim 1, wherein the wedging means is a pivot block pivotally attached to the mounting.

4. The locking mechanism according to claim 3, wherein the pivot block has a normally-pivoted position and an actuated position, the pivot block being proximate an underside of the steering column structure when the pivot block is in the normally-pivoted position.

5. The locking mechanism according to claim 4, wherein the pivot block is resiliently biased into the normally-pivoted position.

6. The locking mechanism according to claim 3, wherein a main portion of the pivot block is spaced from the steering column structure by means of a spacer set in an aperture in the pivot block, the spacer contacting an underside of the steering column structure.

7. The locking mechanism according to claim 6, wherein a blade is provided adjacent to the spacer, the blade being wedged against the underside of the steering column structure as the pivot block pivots to the actuated position.

8. The locking mechanism according to claim 4, wherein the portion of the pivot block proximate the underside of the steering column structure has at least one raised area forming a wedging platform.

9. The locking mechanism according to claim 8, wherein the at least one raised area has at least one plain area for wedging engagement with part of the steering column structure.

10. The locking mechanism according to claim 8, wherein the at least one raised area has at least one serrated area for wedging engagement with part of the steering column structure.

11. The locking mechanism according to claim 10, wherein the underside of the steering column structure is provided with serrations complementary to the raised area serrations.

12. A locking mechanism for locking an axially adjustable vehicle steering column comprising:
 a steering column structure slidably attached to a break away mounting, the steering column structure being axially moveable relative to the mounting; and
 a pivot block for locking the steering column structure to the mounting by means of a wedging action in response to an actuating means, the pivot block having a normally-pivoted position and an actuated position, the pivot block being proximate an underside of the steering column structure when the pivot block is in the normally-pivoted position and being in wedging contact with the underside of the steering column structure when in an actuated position, the pivot block being resiliently biased into the normally-pivoted position, the actuating means being a cable arranged to pull substantially in the axial direction of the steering column.

13. The locking mechanism according to claim 12, wherein the portion of the pivot block which is in wedging contact with the underside of the steering column structure when the pivot block is in the actuated position defines a contact point, the cable being attached to the pivot block at an attachment point which is distal from the contact point and the attachment point is on a line which passes through the contact point and the pivot axis of the pivot block.

14. The locking mechanism according to claim 12, wherein a resilient spacer is attached to the pivot block to resiliently bias the pivot block into the normally-pivoted position, the resilient spacer having an upper portion and a lower stem portion, the lower stem portion having a diameter smaller than the diameter of the upper portion.

15. A locking mechanism for locking an axially adjustable vehicle steering column comprising:

a steering column structure slidably attached to a break away mounting, the steering column structure being axially moveable relative to the mounting; and a pivot block for locking the steering column structure to the mounting by means of a wedging action in response to an actuating means, the actuating means being a cable arranged to pull substantially in the axial direction of the steering column, a portion of the pivot block being in wedging contact with the underside of the steering column structure when the steering column structure is locked to the mounting, said portion defining a contact point, the cable being attached to the pivot block at an attachment point which is distal from the contact point and the attachment point being on a line which passes through the contact point and the pivot axis of the pivot block.

* * * * *